US005429073A

United States Patent [19]
Ballard

[11] Patent Number: 5,429,073
[45] Date of Patent: Jul. 4, 1995

[54] BEDDING MATERIALS FOR ANIMALS

[75] Inventor: Larry Ballard, Columbia, S.C.

[73] Assignee: Shakespeare Company, Columbia, S.C.

[21] Appl. No.: 142,621

[22] Filed: Oct. 26, 1993

[51] Int. Cl.⁶ .............................................. A01K 1/015
[52] U.S. Cl. ....................................... 119/171; 119/28
[58] Field of Search ................ 119/28, 28.5, 171, 174; 428/359, 364, 397

[56] References Cited

U.S. PATENT DOCUMENTS

| | | | |
|---|---|---|---|
| 3,765,371 | 10/1973 | Fisher . | |
| 4,016,117 | 4/1977 | Griffin | 260/17.4 ST |
| 4,021,388 | 5/1977 | Griffin | 260/13 |
| 4,038,944 | 8/1977 | Tucci . | |
| 4,133,784 | 1/1979 | Otey et al. | 260/17.4 ST |
| 4,171,401 | 10/1979 | Legrix et al. | 119/28.5 |
| 4,324,709 | 4/1982 | Griffin | 523/210 |
| 4,337,181 | 6/1982 | Otey et al. | 523/128 |
| 4,873,270 | 10/1989 | Aime et al. | 523/128 |
| 4,983,651 | 1/1991 | Griffin | 524/47 |
| 5,082,882 | 1/1992 | Pettijohn | 524/47 |
| 5,108,807 | 4/1992 | Tucker | 428/35.2 |
| 5,115,000 | 5/1992 | Jane et al. | 524/47 |
| 5,145,779 | 9/1992 | Pometto, III et al. | 435/262 |
| 5,154,864 | 10/1992 | Nishiyama et al. | 264/102 |
| 5,162,392 | 11/1992 | Wool et al. | 523/128 |
| 5,166,232 | 11/1992 | Müller | 524/35 |
| 5,183,010 | 2/1993 | Raymond et al. | 119/172 |
| 5,209,186 | 5/1993 | Dewing | 119/172 |

FOREIGN PATENT DOCUMENTS

| | | | |
|---|---|---|---|
| 0109276A3 | 11/1983 | European Pat. Off. | A01K 1/015 |
| 528660 | 2/1993 | European Pat. Off. | 119/28.5 |
| 2102084 | 7/1972 | Germany . | |
| 2100569 | 1/1983 | United Kingdom | 119/171 |

Primary Examiner—Todd E. Manahan
Attorney, Agent, or Firm—Renner, Kenner, Greive, Bobak, Taylor & Weber

[57] ABSTRACT

A degradable, reusable, partially synthetic and partially non-synthetic bedding material for animals includes a plurality of flexible monofilaments formed from a blend of a thermoplastic polymer and starch. An effective amount of at least one transition metal salt may also be added to enhance ultraviolet and/or thermal degradation. The partially synthetic animal bedding has an appearance, texture and sound very similar to that of natural straw, but can be cleaned and reused repeatedly. The partially synthetic straw-like material is inert as far as digestibility and is degradable when exposed to sunlight and dry heat, and is biodegradable and compostable thereby providing for relatively easy disposal.

23 Claims, No Drawings

BEDDING MATERIALS FOR ANIMALS

TECHNICAL FIELD

The present invention relates to bedding for animals. More particularly, the present invention relates to a synthetic/non-synthetic bedding composition which, to the animal, has an appearance, texture and sound very similar to that of natural straw, but which can be cleaned and reused repeatedly. The partially synthetic strawlike material is inert as far as digestibility and is degradable when exposed to sunlight and/or dry heat. It is also biodegradable and compostable. This strawlike partially synthetic material also has improved physical characteristics as compared to other wholly synthetic bedding materials.

BACKGROUND OF THE INVENTION

Traditionally, natural materials such as straw, saw dust, rice hulls, and grass have been used for bedding materials in animal stalls and like places where animals typically rest. Generally, these natural materials are readily available and can be relatively inexpensive. However, daily disposal and replacement of these natural materials are generally required in order to keep the stalls and the like at least somewhat sanitary. That is, because of soiling and saturation due to animal urine and fetes, at least partial, and sometimes total, replacement of these natural bedding materials is necessary on a daily basis. Inasmuch as each stall may require up to about 100 pounds of new bedding each day, the replacement and disposal of the soiled materials can become a problem for the user. Also, these natural materials are not reusable.

It is also known that natural materials such as straw and the like may generate and stir up dust and other microscopic debris when the animals trample on the straw. This dust and debris fills the air in the stalls which the animals breathe and may result in health problems for the animals.

Accordingly, in order to overcome these problems, substitutes for this natural bedding have been produced. For example, synthetic materials such as mats and cast floors have been introduced. However, some of these bedding systems tend to be easily destroyed by the animal's hoofs and tend to accumulate animal waste on their underside, causing still another disposal problem.

Thus, still other artificial bedding materials have been introduced. For example, Tucci U.S. Pat. No. 4,038,944 discloses an artificial, wholly synthetic bedding material for animals which is reusable and is used to facilitate the removal of animal excretory waste. The bedding material comprises a plurality of rigid, elongated pieces of a nonflammable, nontoxic, hydrophobic, impermeable synthetic plastic. More specifically, this patent proposes the use of stiff or non-flexible strands or fibers of plastic having circular cross-sections which preferably are made of nylon or polyethylene.

However, when these strands are used, care must be taken in arranging the strands in the stalls so that the strands do not protrude into or otherwise irritate the animal. Accordingly, care must be taken to position each of the pieces of plastic relatively parallel to the ground or bottom surface of the particular stall area. This is a time-consuming and arduous task that must be performed in order not to irritate or otherwise harm the animal using the bedding. Thus, rigid strands of thermoplastic resins having round cross-sections are not altogether suitable for bedding materials because of the potential for causing irritation and discomfort to the animals.

In addition to the discomfort problem, these hard strands having circular cross-sections may present a safety risk to the animals. For instance, horses as well as some other animals are generally reluctant to walk on any materials which do not provide a natural feel to them. The strands disclosed in Tucci U.S. Pat. No. 4,038,944 have hard circular cross-sections and thus, when a horse steps on these strands, the strands tend to slip and roll under the hoofs of the horse. Furthermore, these strands have been known to slip and roll over each other, generating a distinctive noise which is also disturbing to the horse. The combination of the unnatural feel of the hard strands and the unusual noise may disturb the horse so much that it will not enter the stall containing the artificial material or, in some instances, may try to jump away from the unnatural feeling material, causing the potential risk of injury.

Moreover, the length of the strands in Tucci U.S. Pat. No. 4,038,944 must vary depending on the size of the animal. This manipulation of the length of the strands is necessary to minimize discomfort to the animal due to the bedding materials tending not to conform to the shape of the particular animal. Thus, the length of the strands must be tailored to the particular animal in relation to its size.

Still further, although these strands can be reused several times, they eventually must be removed from the stall. Accordingly, disposal problems still exist when this material is used. Notably, these plastic pieces are not readily degradable, and therefore, unlike natural materials, do not simply degrade in sunlight. Moreover, these pieces are not biodegradable or compostable, and therefore, cannot simply be spread over agricultural fields to replenish and fertilize the ground. Still further, they are nonflammable and cannot be readily burned. Furthermore, government regulations are restricting the manner in which many products can be disposed because of contamination problems.

It is well known that some non-synthetic additives such as starch can facilitate the degradability of some synthetic resins when blended therewith. For example, Nishiyama et al. U.S. Pat. No. 5,154,864 relates to a degradable sheet (not fibers) formed of cellulose, chitosan and an organic filler such as starch for use as packaging material and for certain farm products unrelated to animal bedding. Muller et al. U.S. Pat. No. 5,166,232 relates to degradable plastic materials containing a blend of synthetic resin, starch and a component to facilitate degradability. Again, however, the disclosed blend is used to form novel films and molded articles such as packaging materials and agricultural mulch materials. Several other references also teach the blending of starch and a synthetic resin; however, none of them teaches or even suggests blending starch with a polymeric material to produce degradable, partially synthetic bedding.

Thus, a need has long existed for an inexpensive, dustless, reusable synthetic/non-synthetic animal bedding which is readily degradable upon exposure to sunlight or dry heat, and which is biodegradable and compostable. Importantly the novel bedding material has the appearance, feel and sound of a natural bedding material so that the animal will feel comfortable using the bedding.

SUMMARY OF INVENTION

It is, therefore, a primary object of the present invention to provide a bedding material for animals.

It is another object of the present invention to provide an animal bedding material, as above, which is relatively inexpensive, washable and reusable.

It is yet another object of the present invention to provide an animal bedding material, as above, which is degradable upon exposure to sunlight or dry heat.

It is still another object of the present invention to provide an animal bedding material as above, which is biodegradable and compostable.

It is a further object of the present invention to provide an animal bedding material, as above, which has the general appearance and texture of natural straw.

It is still a further object of the present invention to provide an animal bedding material, as above, which is comfortable to the animals using it.

It is yet a further object of the present invention to provide an animal bedding material, as above, which does not cause dusting or otherwise promote the presence of debris in the air when the bedding material is trampled upon.

At least one or more of the foregoing objects, together with the advantages thereof over the known art relating to animal bedding, which shall become apparent from the specification which follows, are accomplished by the invention as hereinafter described and claimed.

In general, the present invention provides a reusable, partially synthetic animal bedding comprising a plurality of degradable, soft and flexible, extruded monofilaments formed from a blend of a thermoplastic polymer and a starch. The blend may include from about 50 to 90 percent by weight thermoplastic polymer and 10 to 50 percent by weight starch.

The present invention also includes a method for disposing of partially synthetic animal bedding including a plurality of monofilaments formed from a blend of thermoplastic polymer and starch including the step of composting the material.

The present invention also includes a method for the manufacture of reusable, partially synthetic animal bedding material comprising the steps of blending from about 50 to 90 percent by weight of a thermoplastic polymer and from about 10 to 50 percent by weight of starch and extruding the blend into monofilaments.

PREFERRED EMBODIMENT FOR CARRYING OUT THE INVENTION

The present invention is directed toward a partially synthetic, partially non-synthetic, straw-like material for use as animal bedding in barn stalls and the like. It will be understood that by the term "non-synthetic", it is meant that the filaments of the present invention include a naturally occurring material such as starch which is not a man-made synthetic polymer, as is polyethylene, polypropylene, nylon, etc. The partially synthetic material comprises a plurality of extruded monofilaments comprising a starch-modified thermoplastic polymer. More specifically, the extruded monofilament is formed from a blend of a thermoplastic polymer and a starch compound. At least one transition metal salt may also be added to enhance ultraviolet and/or thermal degradability.

Thermoplastic polymers employed in the present invention may include, but are not necessarily limited to polyolefin resins produced from monomers having from two to about four carbon atoms, nylon, polyethylene terephthalate (PET) and mixtures thereof. While polyolefins of monomers having more than four carbon atoms are not necessarily precluded, polyolefin resins selected from the group consisting of polyethylene and polypropylene are preferred. The most preferred polyethylene resin employed in the present invention is low density polyethylene resin such as is commercially available from Dow Chemical Company of Midland, Michigan under the tradename "LDPE 640". Notably, low density polyethylene (LDPE) is distinguished from high density polyethylene (HDPE) in that the former material typically has highly branched and widely spaced chains, whereas the latter material has comparatively straight and closely aligned chains and is essentially called linear. Also, LDPE tends to be softer and more flexible than HDPE. However, it will be understood that while LDPE is most preferred, the present invention is not necessarily limited thereto. For example, polypropylene resin such as that sold as Grade 31S3A by Lyondell Polymers of Houston, Tex., may also be suitable for use as the synthetic polymer component in the blend.

The synthetic, thermoplastic polymer may be blended with up to about 50 percent by weight of a non-synthetic, branched-chain carbohydrate polymer commonly known as starch. Any organic starch compound having the desired properties as detailed hereinbelow may be suitable for the present invention. Thus, the blend may include from about 50 to 90 percent by weight thermoplastic polymer and from about 10 to 50 percent by weight starch.

More preferably, when polyethylene resin is employed, the blend includes from about 50 to 90 percent by weight polyethylene and from about 10 to 50 percent by weight starch, with a polyethylene/starch ratio of about 75:25 being most preferred. While it is possible to blend the starch directly with the polyethylene prior to extrusion, such a blend is somewhat difficult to make, and therefore, is not the preferred method of blending the polyethylene and starch. Instead, the starch is preferably pre-blended with some of the polyethylene to form a partially synthetic, partially non-synthetic masterbatch. Then, the remainder of the polyethylene is blended with the masterbatch. The polyethylene/starch masterbatch or concentrate is commercially available from Fully Compounded Plastics, Inc. (FCP) of Decatur, Ill. under the tradename "Polystarch".

In the most preferred embodiment, about 50 percent by weight polyethylene pellets such as "LDPE 640" are blended with about 50 percent by weight of a polyethylene/starch masterbatch such as "Polystarch", the masterbatch comprising about 50 percent by weight polyethylene and about 50 percent by weight starch. Accordingly, about 25 percent by weight starch is included in the entire blend.

Prior to extrusion, an effective amount of transition metal salts to enhance ultraviolet and/or thermal degradation may be added to the blend of thermoplastic polymer and starch. These prodegradant salts promote the degradation of the extruded monofilament upon exposure to ultraviolet sunlight or dry heat and include, but are not necessarily limited to, cerium, iron, manganese stearates. That is, the more prodegradant salts used in the blend, the more quickly the blend will degrade upon exposure to UV radiation or dry heat.

The blend may be extruded into monofilaments having rectangular cross-sections compatible with the type of thermoplastic being utilized. For example, when LDPE is employed, the blend is extruded at normal low density polyethylene extrusion temperatures of from about 154° C. to 185° C. into monofilaments having rectangular cross sectional dimensions of from about 15 mil×75 mil to about 30 mil×150 mil. Importantly, it has been found that if the filaments are extruded with a rectangular cross section, rather the a circular cross section, then the feel or general texture of the filaments is similar to that of natural straw. This similar texture permits the horse or other animal to be more comfortable in the stall or other resting place inasmuch as the properties of the filaments closely resemble those of natural straw.

The monofilaments are preferably cut into lengths of from about 16 inches to about 24 inches before being packaged. Notably, the size of the animal which will be using the partially synthetic material as bedding is of little concern because the material is soft and flexible, and does not require attention in order to avoid irritation of the animal.

in use, the monofilaments or strands are randomly distributed onto the ground or floor of the stall. Again, because the strands of the present invention are soft and flexible, the orientation or position of the strands is not a concern. No special arrangement of the strands is necessary and no additional effort to distribute the strands on the stall floor is required.

in order to demonstrate practice of the invention, a masterbatch of 50 percent by weight low density polyethylene and 50 percent by weight starch was dry blended with low density polyethylene pellets such that the weight percent ratio of polyethylene to starch was about 75:25. The blend was then extruded using a 2½ inch single screw extruder with a 6 hole die having a cross sectional dimension of about 0.06 inches×0.27 inches. Monofilaments were extruded at temperatures ranging from about 154° C. to about 185° C., and the extruder output was 30 pounds per hour. The monofilament was extruded into a water quench tank which had a water temperature of about 18.3° C. (65° F.) and was then wound onto spools. After the line was spooled, the filament was cut into strand lengths of from about 16 inches to 24 inches and packaged by commercially known methods.

Compared to polyethylene, nylon or other known wholly synthetic filaments, the partially non-synthetic filaments of the present invention are softer, have a "warm" feel and do not have the "shiny" plastic appearance of synthetic filaments. The filaments of the present invention have the naturally non-smooth surface associated with natural products such as would be seen in natural straw. in addition, the filaments of the present invention are softer than wholly synthetic filaments. The advantage of the naturally non-smooth surface and the softness of the filaments of the present invention is that when used as bedding in horse stalls, for example, horses can walk on the material without slipping. In addition, since the filaments of the present invention are relatively soft, animals can walk on the filaments without causing the snapping and crackling noise associated with wholly synthetic filaments. Controlled tests have shown that when filaments of the present invention are used as bedding in horse stalls, horses will enter and remain in the stalls without hesitation and will behave normally. By contrast, it has been observed that when round, fully synthetic filaments are used for bedding in horse stalls, horses are hesitant to walk on such filaments or if they do enter a stall with the wholly synthetic material, they will refuse to walk on the filaments or will even try to escape from the stall risking injury. The filaments of the present invention have the look, feel and sound of natural straw.

Furthermore, the partially synthetic material of the present invention is also dustless. That is, the filaments of the present invention do not break down when trampled upon. Thus, when an animal enters the stall and tramples on the bedding, no dust from the material is thrown into air thereby eliminating the risk of health problems associated with such dust.

Additionally, the partially synthetic material comprising thermoplastic polymers and starch is inert with respect to digestibility. More particularly, feeding studies have shown that if ingested, low density polyethylene and starch blends do not react in a manner harmful to the animal and pass through the animal unchanged such that no harm is done to the animal. Other thermoplastic polymers, when blended with starch are believed to act in this same manner.

Still further, the partially synthetic material of the present invention can be cleaned and reused repeatedly, thus eliminating the need to dispose of large amounts of natural straw or the like. Portions of the synthetic/non-synthetic straw-like material may be removed from the stall in order to remove any excretory matter found thereon or therein. After a period of time of about a week, the partially synthetic material may be removed from the stall and washed. Once it is dry, the material can be placed in the stall again. This washing, drying and reusing of the synthetic/non-synthetic materials can be repeated several times, and therefore, the straw-like material can be used for several weeks.

However, after being used for a period of time, the bedding material will have to be discarded. The disposal of the material can occur by degradation due to UV radiation from sunlight and/or by thermal and biological degradation during composting. UV and thermal degradation is aided by the addition of transition metal salts as noted hereinabove. With respect to thermal degradation, the tensile strength of sample polyethylene/starch monofilaments were tested by exposing them to composting temperatures of about 65° C. (150° F.). The tensile strength of these monofilaments was reduced from 820 psi to 690 psi, on average after two weeks. The elongation of these same samples was reduced from 76% to 44%.

in another accelerated test for the thermal degradability of the preferred polyethylene-starch blend, films having low density polyethylene and 12.5 percent by weight starch were exposed to about a 60° C. temperature and approximately 50 percent relative humidity. The tensile strength of these modified films were compared to the tensile strength of 100 percent by weight low density polyethylene films. After 50 days, the tensile of the modified film was about 50 percent of its original strength. The 100 percent LDPE films retained about 80 percent of its original strength. In a similar test, the modified films of the LDPE/starch blend lost 100 percent of its tensile and were totally destroyed in 60 days when exposed to sunlight.

Biodegradability of several samples of the bedding material of the present invention was also evaluated using the ASTM D5209-91 Aerobic Biodegradation test. In this test, the samples were exposed to bacteria at room temperature. Carbon dioxide ($CO_2$) evolution was measured throughout the test. Notably, the samples exposed to the bacteria were biodegraded in view of the evolution of $CO_2$. Also, after one week, the tensile strength of the sample monofilaments was reduced from 820 psi to 639 psi and the elongation thereof was reduced from 76 percent to 38 percent.

The synthetic/non-synthetic material can thus be disposed of by composting. Under normal composting conditions, whereby the temperature reaches about 65° C. (150° F.), bacterial action and thermal conditions will cause the filament to be broken down into increasingly smaller pieces. This action is hastened by bacterial attacks on the starch which is included in the monofilament. As the starch is consumed, the surface area of the filament increases, allowing yet more bacterial attacks to occur. The prodegradant salts in the monofilament, when employed, accelerate thermal degradation causing a reduction in the molecular weight of the polyethylene. When the molecular weight is reduced sufficiently, bacteria can attack the polyethylene remnants reducing it to humus. The monofilament will therefore be fully composted allowing it to be recycled.

As previously indicated, the monofilaments of the present invention will also degrade upon exposure to UV radiation. An accelerated test whereby samples of the bedding material were exposed to UV radiation in a Q-U-V test unit was conducted to determine this result. After being exposed to UV radiation for one week, the tensile strength of the material was reduced from 820 psi to 565 psi. The elongation of the sample monofilaments was reduced from 71 percent to 6 percent after the same period. One week in the Q-U-V test unit is equivalent to about six months of natural sunlight.

At this point, it is also noted that the monofilaments of the present invention may be disposed of by burning. Although government regulations may limit the manner of disposal, it is noted that the material is flammable for disposal purposes.

Thus, in view of the characteristics described hereinabove, it should be evident that the partially synthetic, partially non-synthetic monofilaments of the present invention are highly effective in providing an inexpensive, dustless, reusable bedding for animals. The invention is particularly suited for horse stalls, but is not necessarily limited thereto. Furthermore, it should be understood that although blends of polyethylene and starch are known in the art, it was completely unexpected that these blends would be naturally soft and flexible and useful for producing strands which are similar in appearance, texture and sound to natural straw.

Based upon the foregoing disclosure, it should now be apparent that the use of the partially synthetic animal bedding described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the monofilaments of the present invention may include any thermoplastic polymer suitable for use with starch for forming the monofilament, including but not necessarily limited to polyolefins produced from monomers having from two to about four carbon atoms, nylon and PET. Furthermore, the monofilaments according to the present invention are not necessarily limited to those having a rectangular cross section. Moreover, as noted hereinabove, ocher means for extruding the monofilaments can be employed besides the extrusion method detailed in the example and the extrusion temperatures, quench temperature, and other parameters for extruding the material are not necessarily to be limited thereto. Thus, the scope of the invention shall include all modifications and variations that may fall within the scope of the attached claims.

What is claimed is:

1. Reusable partially synthetic animal bedding comprising:
    a plurality of degradable, soft, and flexible, extruded monofilaments formed from a blend of a thermoplastic polymer and a starch;
    wherein said thermoplastic polymer is a polyolefin produced from monomers having two to about four carbon atoms; and
    wherein said blend includes about 50 percent by weight of said polyolefin and about 50 percent by weight of a masterbatch comprising about 50 percent by weight of said polyolefin and about 50 percent by weight of said starch.

2. Reusable, partially synthetic animal bedding, as set forth in claim 1, wherein said polyolefin is polyethylene.

3. Reusable, partially synthetic animal bedding, as set forth in claim 1, wherein said blend further includes an effective amount of at least one transition metal salt to enhance UV degradability.

4. Reusable, partially synthetic animal bedding, as set forth in claim 1, wherein said monofilaments have a length ranging from about 16 inches to 24 inches.

5. Reusable, partially synthetic animal bedding, as set forth in claim 1, wherein said monofilaments have a rectangular cross section to provide said monofilament with a texture which is similar to that of natural straw.

6. Reusable, partially synthetic animal bedding, as set forth in claim 1, wherein said blend is degradable upon exposure to sunlight.

7. Reusable, partially synthetic animal bedding, as set forth in claim 1, wherein said blend is degradable upon exposure to dry heat.

8. Reusable, partially synthetic animal bedding, as set forth in claim 1, wherein said blend is biodegradable.

9. Reusable, partially synthetic animal bedding, as set forth in claim 1, wherein said monofilaments have a similar appearance, texture and sound to natural straw.

10. A method for the manufacture of reusable, partially synthetic animal bedding material comprising the steps of:
    blending a thermoplastic polymer and a starch, wherein said thermoplastic polymer is a polyolefin resin and wherein said step of blending includes the steps of preparing a masterbatch comprising about 50 percent by weight of said polyolefin resin and about 50 percent by weight of said starch and blending about 50 percent by weight of said masterbatch with about 50 percent by weight of said polyolefin resin; and extruding said blend into monofilaments.

11. A method for the manufacture of reusable, partially synthetic animal bedding material, as set forth in claim 10, including the additional step of adding an effective amount of at least one transition metal salt to said blend prior to extruding to enhance ultraviolet and thermal degradability.

12. A method for the manufacture of reusable, partially synthetic animal bedding material, as set forth in claim 10, including the additional step of cutting said monofilaments to a length ranging from about 16 inches to 24 inches.

13. A method for the manufacture of reusable, partially synthetic animal bedding material, as set forth in claim 10, wherein said step of extruding includes the step of extruding said monofilaments through a die of rectangular cross section.

14. Reusable, partially synthetic animal bedding comprising:

a plurality of degradable, soft, and flexible, extruded monofilaments formed from a blend of from about 50 to 90 percent by weight of a polyolefin and about 10 to 50 percent by weight of a starch; said blend including about 50 percent by weight of a masterbatch of said polyolefin and said starch.

15. Reusable, partially synthetic animal bedding, as set forth in claim 14, wherein said masterbatch includes up to about 80 percent by weight of said polyolefin and at least about 20 percent by weight of said starch to total 100 parts by weight of said masterbatch.

16. Reusable, partially synthetic animal bedding, as set forth in claim 14, wherein said blend further includes an effective amount of at least one transition metal salt to enhance UV degradability.

17. Reusable, partially synthetic animal bedding, as set forth in claim 14, wherein said monofilaments have a rectangular cross section to provide said monofilament with a texture which is similar to that of natural straw.

18. Reusable, partially synthetic animal bedding, as set forth in claim 14, wherein said blend is UV degradable.

19. A method for the manufacture of reusable, partially synthetic animal bedding material comprising the steps of:

preparing a masterbatch of polyolefin resin and starch;

blending about 50 percent by weight of a polyolefin resin and about 50 percent by weight of said masterbatch such that the blend includes from about 50 to 90 percent by weight polyolefin resin and from about 10 to 50 percent by weight starch; and extruding said blend into monofilaments.

20. A method, as set forth in claim 19, wherein said masterbatch includes up to about 80 percent by weight of said polyolefin resin and at least about 20 percent by weight of said starch to total 100 percent by weight of said masterbatch.

21. A method, as set forth in claim 19, wherein said blend further includes an effective amount of at least one transition metal salt to enhance UV degradability.

22. A method, as set forth in claim 19, wherein said monofilaments have a rectangular cross section to provide said monofilament with a texture which is similar to that of natural straw.

23. A method, as set forth in claim 19, wherein said blend is UV degradable.

* * * * *